Feb. 15, 1938.   F. FRELIN   2,108,532
COOLING DEVICE FOR PISTONS
Filed March 5, 1937

INVENTOR
Fritjof Frelin
BY
*Cadden*
HIS ATTORNEY.

Patented Feb. 15, 1938

2,108,532

UNITED STATES PATENT OFFICE 2,108,532

COOLING DEVICE FOR PISTONS

Fritjof Frelin, Phillipsburg, N. J., assignor to Ingersoll-Rand Company, Jersey City, N. J., a corporation of New Jersey Application March 5, 1937, Serial No. 129,143

5 Claims. (Cl. 309—9)

This invention relates to cooling devices, and more particularly to cooling devices for pistons of internal combustion engines and similar machines in which the piston head is exposed to extremely high temperatures.

The invention is particularly applicable to pistons of large diameter of which the central areas of the head are located too far from the cylinder wall to permit of the heat to be removed at a sufficiently rapid rate to prevent distortion, fracture or burning of the head.

It is an object of the present invention to maintain the temperature of the piston head within safe limits.

Other objects will be in part obvious and in part pointed out hereinafter.

Figure 1:
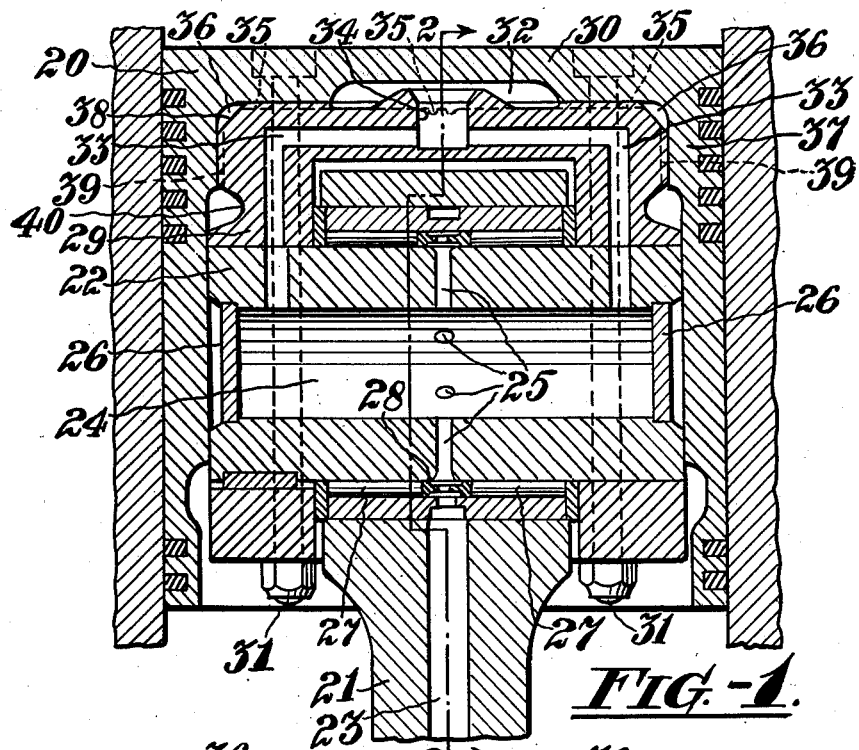
Figure 2:
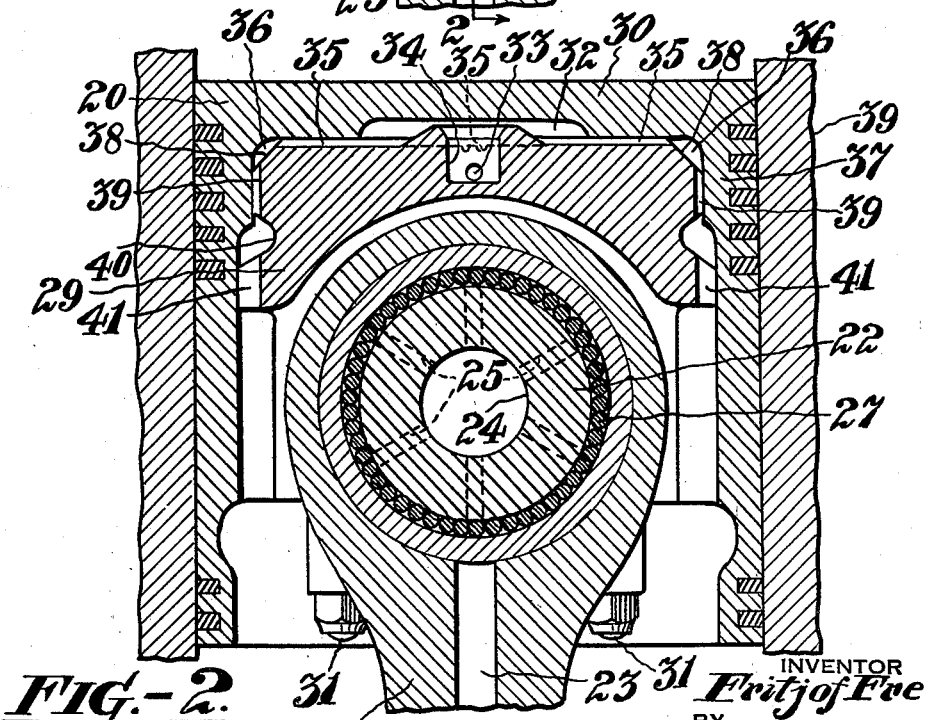

In the drawing accompanying this specification and in which similar reference numerals refer to similar parts, Figure 1 is a sectional elevation of a piston constructed in accordance with the practice of the invention, and Figure 2 is a transverse view taken through Figure 1 on the line 2—2.

Referring to the drawing, 20 designates a piston and 21 a connecting rod which is connected to the piston by a wrist pin 22.

The connecting rod 21 is provided with the usual passage 23 for conveying oil under pressure to the surfaces, within the piston, requiring lubrication, and in the present instance the wrist pin 22 is provided with a bore 24 extending entirely therethrough to form a chamber for oil which is admitted into the said chamber by passages 25 in the wrist pin and communicating with the passage 23. The ends of the chamber 24 are preferably sealed by suitable plates 26 inserted in the ends of the wrist pin.

In the construction shown the connecting rod 21 oscillates with respect to the wrist pin 22 and in order to minimize friction roller bearings 27 are interposed between the two. The roller bearings are preferably arranged in groups on opposite sides of a spacer ring 28 which is ported to afford communication between the passages 25 and 23.

In accordance with the practice of the invention an insert or bearing block 29 is disposed within the piston 20 to seat against the head 30 of the piston where it is held securely by a plurality of bolts 31. The ends of the wrist pin are seated in the bearing block and the wrist pin is preferably keyed to the bearing block.

The central portion of the inner surface of the piston head 30 is recessed to provide a cooling chamber 32 for which the adjacent surface of the insert 29 forms a bounding surface. The cooling chamber 32 communicates with the chamber 24 in the wrist pin 22 and the insert 29 through passages 33 opening into the chamber 32 through a common port 34.

In the surface of the insert 29 seating against the head 30 are a plurality of radial passages 35 which extend along the inner surface of the head 30 and open into an annular passage 36 at the juncture of the head 30 and the skirt 37 of the piston. The annular passage 36 may be defined by a beveled surface 38 on the insert and the inner surface of the piston and in the periphery of the insert are a plurality of longitudinally extending passages 39 to convey oil along the portion of the skirt 37 adjacent the head 30 and in the region of the sealing rings carried by the piston.

The insert 29 is provided with a peripheral groove 40 into which the passages 39 discharge and also with discharge passages 41 for the passage of cooling fluid from the groove 40 to the crank case.

Any suitable number of passages 35 and 39 may be provided to assure a correct and even cooling effect. It is to be understood, however, that the total flow area of the passages 39 is preferably somewhat less than that of the passages leading to the chamber 32 so that the velocity of the oil flowing through the passages 35 and 39 will be considerably accelerated and thus assure a rapid removal of the heat of combustion from the piston head. If desired, both the passages 35 and 39 may be restricted, although, as a preferred arrangement the passages 39 constitute the passages of minimum flow area.

I claim:

1. In a cooling device, the combination of a piston and a connecting rod, a wrist pin connecting the piston and connecting rod, a bearing member between the wrist pin and the connecting rod, a cooling and lubricating fluid chamber in the wrist pin, means defining passages for conveying fluid from the fluid chamber to the bearing member, a second fluid chamber adjacent the head of the piston in open communication with said fluid chamber, and means defining a plurality of passages for conveying fluid from said second chamber to the skirt of the piston.

2. In a cooling device, the combination of a piston and a connecting rod, a wrist pin connecting the piston and connecting rod, a bearing member between the wrist pin and the connecting rod, a cooling and lubricating fluid chamber in the wrist pin, means defining passages for conveying fluid from the fluid chamber to the bearing member, a second fluid chamber in the piston in free communication with said fluid chamber, and a plurality of passages leading from the second said chamber along the head to the skirt of the piston.

3. In a cooling device, the combination of a piston and a connecting rod, a wrist pin connecting the piston and connecting rod, a bearing member between the wrist pin and the connecting rod, a cooling and lubricating fluid chamber in the wrist pin, means defining passages for conveying fluid from the fluid chamber to the bearing member, a second fluid chamber in the piston in free communication with said fluid chamber, and means defining a plurality of radial passages for conveying fluid from the second said chamber along the head to the skirt of the piston.

4. In a cooling device, the combination of a piston and a connecting rod, a wrist pin connecting the piston and connecting rod, a bearing member between the wrist pin and the connecting rod, a cooling and lubricating fluid reservoir in the wrist pin, means defining passages for conveying fluid from the reservoir to the bearing member, a fluid chamber in the piston in free communication with the reservoir, and means defining a plurality of passages for conveying cooling fluid from the said fluid chamber along the head and skirt of the piston.

5. In a cooling device, the combination of a piston and a connecting rod, a wrist pin connecting the piston and connecting rod, a bearing member between the wrist pin and the connecting rod, a cooling and lubricating fluid reservoir in the wrist pin, means defining passages for conveying fluid from the reservoir to the bearing member, a fluid chamber in the piston in free communication with the reservoir, an insert in the piston forming a bounding surface for the said fluid chamber and having a plurality of radial passages for conveying cooling fluid along the head to the skirt of the piston, and there being a plurality of passages in the periphery of the insert to convey fluid along the skirt of the piston.

FRITJOF FRELIN.